United States Patent
Bissonnette et al.

[11] Patent Number: 6,116,383
[45] Date of Patent: Sep. 12, 2000

[54] WET DISC PACK WITH VARIABLE CO-EFFICIENTS OF FRICTION DISCS

[75] Inventors: Lee A. Bissonnette, Clarkston; Theodore H. Stringer, III, Southfield, both of Mich.

[73] Assignee: Meritor Heavy Vehicle Systems, LLC, Troy, Mich.

[21] Appl. No.: 09/176,177

[22] Filed: Oct. 21, 1998

[51] Int. Cl.[7] .............................. F16D 13/60; F16D 55/36
[52] U.S. Cl. ................. 188/71.5; 192/70.12; 192/113.3; 192/107 M
[58] Field of Search ............................... 188/71.5, 251 A, 188/251 M; 192/70.12, 70.14, 107 M, 107 R, 113.3

[56] References Cited

U.S. PATENT DOCUMENTS

| | | | |
|---|---|---|---|
| 4,609,076 | 9/1986 | Collins et al. | 188/71.5 |
| 5,295,560 | 3/1994 | Moseley | 188/71.5 |
| 5,323,880 | 6/1994 | Wells et al. | 188/71.5 |
| 5,509,507 | 4/1996 | Wells et al. | 188/71.5 |
| 5,535,870 | 7/1996 | Takezaki et al. | 192/70.14 |
| 5,551,534 | 9/1996 | Smithberger et al. | 188/71.5 |

*Primary Examiner*—Chris Schwartz
*Attorney, Agent, or Firm*—Howard & Howard

[57] ABSTRACT

A disc pack for a wet disc brake assembly includes a plurality of rotating discs. The rotating discs adjacent the axial end of the disc pack are formed of a lower co-efficient of friction material than more centrally located discs. In this way, the wear across the disc pack is more uniform, and a greater load can be carried. In addition, in this way the centrally located discs provide greater braking work than they would if they had the same co-efficient of friction as the axially outermost discs. Applicant has determined that the axially outermost discs see greater force from the braking components, and thus would perform more work than the central discs given equal co-efficients of friction. In this way, the useful life of the disc pack is increased since more work is done by the central discs and wear is more uniform.

9 Claims, 1 Drawing Sheet

WET DISC PACK WITH VARIABLE CO-EFFICIENTS OF FRICTION DISCS

BACKGROUND OF THE INVENTION

This invention relates to an improvement in friction disc packs for wet disc brakes wherein the co-efficients of friction of the friction plates varies across the pack.

Wet disc brakes are utilized in many vehicle braking applications. They are also used in many non-vehicle braking applications. In particular, a number of rotating discs are provided with a friction surface, and are connected for rotation with a wheel hub. The discs are slidable axially along the wheel hub. The rotating discs are interspaced with stationary discs which are connected to an outer stationary member. The stationary discs are also axially slidable relative to the outer stationary member.

A hydraulic chamber is associated with a piston, and when hydraulic fluid is delivered to the chamber, the piston moves to compress the rotating and stationary discs together to reduce the rotation of the rotating member relative to the stationary member.

These types of brakes typically include a plurality of interspaced stationary and rotating discs. Often, as many as ten rotating discs are used in combination with eleven stationary discs.

The discs are spaced at one end of the piston, and a reaction surface of the stationary housing is at the opposed end of the discs. Thus, the piston pushes the discs together and against the opposed reaction surface. A rebound force is created from the opposed reaction surface back into the discs. The piston force is applied directly on the discs closest to the piston.

Applicant has found that there is not a constant force across the discs. Rather, the discs closest to the piston, and the discs closest to the opposed wall, see the greatest force. Applicant has also found that due to this, the discs adjacent the two ends of the disc pack experience the most wear, and need to be replaced more quickly than more centrally located discs. However, the friction discs and stationary discs are replaced as a pack, and thus the centrally located discs may not be worn when replaced.

Due to this phenomena, disc packs do not have as long a life as they would otherwise have. If there were more uniform wear, then the life of the disc pack could be increased.

SUMMARY OF THE INVENTION

In a disclosed embodiment of this invention, the friction discs closest to the piston are of a lower coefficient of friction than discs spaced more centrally within the disc pack. In a preferred embodiment, discs on both sides of the central discs have lower co-efficients of friction than the discs at the central location. In a most preferred embodiment, the discs at the axially outer extremes of the disc pack have the lowest coefficient of friction. The central discs spaced more towards the piston have a medium coefficient of friction, and the discs spaced closer to the opposed wall, but still in a central location, have the highest co-efficient of friction.

The discs with the lower coefficient of friction have a greater ability to transmit and/or disperse energy. The arrangement of the discs having the varying co-efficient of friction insures a more uniform wear across the disc pack. This in turn increases the useful life of the disc pack, and insures that there will be more uniform wear across the disc pack, and such that the disc pack need not be replaced as frequently.

These and other features of the present invention can be best understood from the following specification and drawings, the following of which is a brief description.

DETAILED DESCRIPTION OF A PREFERRED EMBODIMENT

Figure 1:
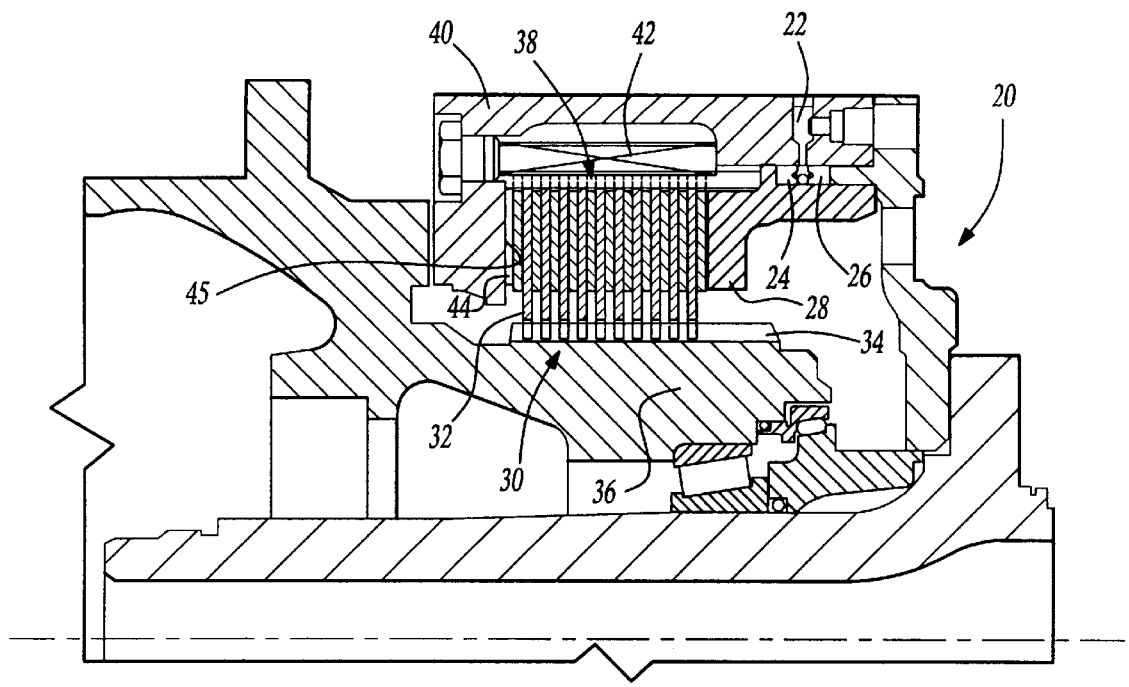
FIG. 1 is a cross-sectional view through a brake according to the present invention.

An inventive brake system 20 is illustrated in FIG. 1 having a hydraulic connection 22 leading to a chamber between a pair of seals 24 and 26. The brake is shown as the type used in vehicle applications, although it should be understood that his type of brake is also used in many on-vehicle applications. Examples include boat anchor lifts, etc. The chamber is positioned such that when pressurized hydraulic fluid is delivered to the chamber through passage 22 a piston 28 is driven to the left as shown in FIG. 1. When the piston 28 is driven to the left it compresses a disc pack 30.

Disc pack 30 includes rotating friction discs 32 which may be splined to teeth 34 on a rotating member 36. Interspaced with the rotating discs 32 are stationary discs 38. The stationary discs 38 may be splined against rotation within an outer stationary member 40. A spring 42 normally biases the piston 28 to the right as shown in FIG. 1. The pressurized hydraulic fluid acts to move the piston against the force of spring 42, and compress the disc pack 30.

The spacer disc 44 is positioned adjacent an end wall 45 of the stationary member 40. The disc pack chamber is immersed in oil.

Applicant has found that when the brake is applied, and the piston 28 is driven to the left as shown in FIG. 1, there is a higher force on the discs 32 adjacent to the piston 28 than in the more centrally located discs. Further, the discs spaced adjacent the spacer 44 and the stationary wall 45 see a rebound force such that they also experience a greater force than the centrally located discs. These greater forces experienced by the axially outer discs result in greater wear.

Figure 2:
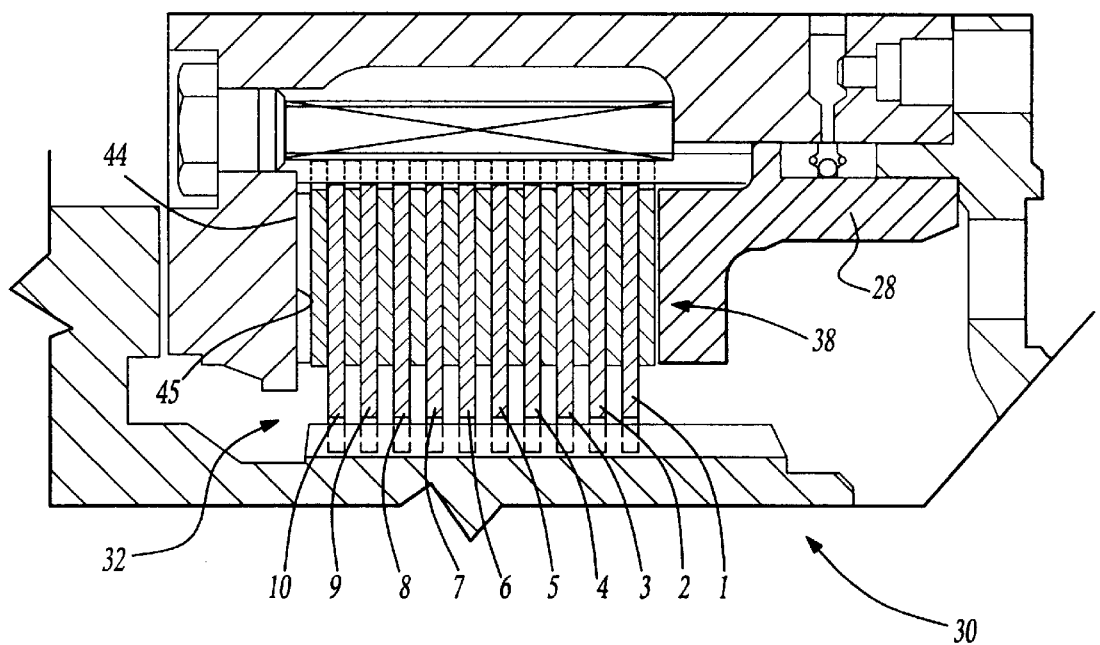
FIG. 2 is an enlarged view of a portion of a FIG. 1 brake.

The present invention can be understood with regard to FIG. 2. As shown in FIG. 2, the friction discs 32 are numbered one through 10 in order moving away from the piston 28. Although shown in a ten disc pack, it should be understood the packs have other numbers of discs which will also benefit from this invention.

The present invention improves upon the prior art by forming the discs closer to the piston 28, and preferably closer to the end wall 45, of material which has a lower co-efficient of friction than the more centrally located discs.

In one embodiment, the discs 1, 2, 9 and 10 are formed of a material such that they have the lowest static and dynamic co-efficient of friction in the pack. Such discs would also have a high power absorption function.

The discs 3, 4 and 5 are formed of a material such that they have a moderate static and dynamic co-efficient of friction. These discs would also have a high power absorption variable.

The discs 6, 7 and 8 have the highest static and dynamic co-efficient of friction. The use of the discs in this order will insure that the discs 6, 7 and 8 will perform a greater percentage of the braking work given an equal force across the disc pack. However, Applicant has determined that there is not an equal force across the disc pack, and that the force is actually greater adjacent the outer ends of the disc pack (i.e., discs 1, 2, 9 and 10). Thus, by forming discs 1, 2, 9 and 10 of the lowest co-efficient of friction, Applicant insures that the wear on discs 1, 2, 9 and 10 is more equal with the wear on discs 6, 7 and 8. Further, Applicant has determined that the discs 3, 4 and 5 will also experience higher forces than discs 6, 7 and 8. Thus, the discs 3, 4 and 5 are formed of a higher co-efficient of friction than discs 1, 2, 9 and 10, but a lower co-efficient of friction than discs 6, 7 and 8. Again, this will result in more uniform wear across the entire disc pack.

In one embodiment, the lowest co-efficient of friction discs may be provided by discs available from Raybestos under product no. 7026-2 (paper only), 789-4 (graphite and paper) or 7901-3 (paper only). The medium co-efficient of friction discs 3, 4 and 5 may also be provided by a Raybestos disc available under product no. 6475-4 (prod. matl.). The highest co-efficient of friction may be provided by discs available from Wellman (carbon fabric).

It should be understood while specific types of discs are mentioned, the present invention extends to any types of discs having the general arrangement of co-efficients of frictions as explained above, or as claimed, which will result in more uniform wear across the disc pack. As an example, catalogs are publicly available that list available disc materials and co-efficients of friction. A worker in this field, with such catalogs, could select any number of disc combinations to achieve the goals of this invention.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A disc pack for a disc brake assembly comprising:
   a plurality of stationary discs;
   a plurality of rotating discs interspaced with said stationary discs, said rotating and stationary discs extending along a central axis between two axial ends; and
   axially outer discs adjacent each axial end of said disc pack having a lower co-efficient of friction than discs between said axial ends of said disc pack.

2. A disc pack as recited in claim 1, wherein the two axially outermost discs adjacent each axial end are provided with a lower co-efficient of friction material, and there being additional discs intermediate said two outermost discs at each axial end, said intermediate discs having a higher co-efficient of friction then said axially outermost discs.

3. A disc pack as recited in claim 2, wherein there are a plurality of discs spaced towards one end of said disc pack having a co-efficient of friction that is higher than said co-efficient of friction of said axially outermost discs, but lower than a plurality of discs spaced towards the other end, and intermediate said axially outermost discs.

4. A disc pack as recited in claim 3, wherein there are ten rotating discs in said disc pack, with the third, fourth and fifth disc being formed of a medium co-efficient of friction material and the sixth, seventh and eighth disc being formed of the highest co-efficient of friction material.

5. A disc brake assembly comprising:
   a disc pack incorporating a plurality of rotating discs interspaced with a plurality of stationary discs;
   a rotating member which rotates with said rotating discs, said rotating discs being axially movable along said rotating member;
   a stationary member fixed against rotation with said stationary discs, said stationary discs being axially along within said stationary member;
   a piston for moving said stationary discs and said rotating discs together to reduce rotation of said rotating member; and
   said disc pack including axially outermost ones of said rotating discs, and central discs between said axially outermost rotating discs, said axially outermost rotating discs having a lower co-efficient of friction than said centrally located discs.

6. An assembly as recited in claim 5, wherein the two axially outermost discs adjacent each axial end are provided by a lower co-efficient of friction material, and there being additional discs intermediate said to two outermost discs at each axial end, said intermediate discs having a higher co-efficient of friction then said axially outermost discs.

7. An assembly as recited in claim 5, wherein there are a plurality of discs spaced towards one end of said disc pack having a co-efficient of friction that is higher than said co-efficient of friction of said axially outermost two discs, but lower than a plurality of discs spaced towards the other end, and intermediate said axially outermost discs.

8. An assembly as recited in claim 7, wherein there are ten rotating discs in said disc pack, with the third, fourth and fifth disc being formed of a medium co-efficient of friction material and the sixth, seventh and eighth disc being formed of the highest co-efficient of friction material.

9. An assembly as recited in claim 5, wherein said disc brake assembly is incorporated into a vehicle.

* * * * *